United States Patent
Eigl et al.

(10) Patent No.: US 11,825,977 B2
(45) Date of Patent: Nov. 28, 2023

(54) METHOD OF OPERATING A STEAM GENERATOR, STEAM GENERATOR AND COOKING DEVICE

(71) Applicant: E.G.O. Elektro-Geraetebau GmbH, Oberderdingen (DE)

(72) Inventors: Sebastian Eigl, Bretten (DE); Sebastian Erbe, Knittlingen (DE); Ralf Pawlowitsch, Karlsruhe (DE); Konrad Schoenemann, Sulzfeld (DE); Elisabeth Stoetzner, Bretten (DE)

(73) Assignee: E.G.O. ELEKTRO-GERAETEBAU GMBH, Oberderdingen (DE)

(*) Notice: Subject to any disclaimer, the term of this patent is extended or adjusted under 35 U.S.C. 154(b) by 462 days.

(21) Appl. No.: 16/952,405

(22) Filed: Nov. 19, 2020

(65) Prior Publication Data
US 2021/0177187 A1    Jun. 17, 2021

(30) Foreign Application Priority Data
Dec. 13, 2019    (EP) ..................... 19216086

(51) Int. Cl.
*A47J 27/04*    (2006.01)
*A47J 36/32*    (2006.01)
(Continued)

(52) U.S. Cl.
CPC ............... *A47J 27/04* (2013.01); *A47J 36/32* (2013.01); *F22B 1/285* (2013.01); *F22D 5/00* (2013.01);
(Continued)

(58) Field of Classification Search
CPC ...... A47J 27/04; A47J 27/05; A47J 2027/043; F22B 1/284; F22B 1/285; F22D 5/00
See application file for complete search history.

(56) References Cited

U.S. PATENT DOCUMENTS

| | | |
|---|---|---|
| 4,991,545 A | 2/1991 | Rabe et al. |
| 7,730,830 B2 | 6/2010 | Kaneko et al. |

(Continued)

FOREIGN PATENT DOCUMENTS

| | | |
|---|---|---|
| CN | 106765034 A | 5/2017 |
| CN | 108980812 A | 12/2018 |

(Continued)

OTHER PUBLICATIONS

European Patent Office, Extended European Search Report received for Application No. 19216086.9, dated Jun. 17, 2020, 9 pages, Germany.

(Continued)

*Primary Examiner* — John J Norton
(74) *Attorney, Agent, or Firm* — Alston & Bird LLP

(57) ABSTRACT

A steam generator has a water container and an upper heating device and a lower heating device, a first temperature detection device covering a temperature detection area including the area covered by the two heating devices, a control device for monitoring and evaluating the first temperature detection device and for controlling the activation state of the two heating devices. For operation of the steam generator, water is filled into the container, at least one of the two heating devices is activated for generating steam for an operation of a steam household device, wherein finally this operation is over. Then at least the lower heating device is activated, until the first temperature detection device detects that a pre-defined first temperature threshold has been reached, upon which the lower heating device is deactivated. Remaining water is pumped off from the water container for a pre-defined first pumping duration.

18 Claims, 6 Drawing Sheets

(51) Int. Cl.
    *F22B 1/28*     (2006.01)
    *F22D 5/00*     (2006.01)

(52) U.S. Cl.
    CPC ...... *A47J 2027/043* (2013.01); *A47J 2202/00* (2013.01)

(56) References Cited

U.S. PATENT DOCUMENTS

| | | |
|---|---|---|
| 2007/0183555 A1 | 8/2007 | Kaneko et al. |
| 2017/0086257 A1 | 3/2017 | Muehlnikel et al. |

FOREIGN PATENT DOCUMENTS

| | | | |
|---|---|---|---|
| CN | 109008594 A | * 12/2018 | ............ A47J 27/004 |
| CN | 109008594 A | 12/2018 | |
| CN | 203000534 U | 6/2023 | |
| DE | 102013200277 A1 | 1/2014 | |
| EP | 0193863 A2 | 9/1986 | |
| EP | 1729064 A1 | 12/2006 | |
| EP | 2366315 B1 | 3/2016 | |
| EP | 2397755 B1 | 10/2016 | |
| EP | 3278691 A1 | 2/2018 | |
| EP | 2409571 A1 | 1/2021 | |
| JP | H 0337013 A | 2/1991 | |
| KR | 10-2007-0002564 A | 1/2007 | |
| WO | WO 2007/136268 A1 | 11/2007 | |

OTHER PUBLICATIONS

European Patent Office, Communication pursuant to Article 94(3) EPC received for Application No. 19216086.9, dated Feb. 6, 2023, 8 pages, Germany.

China National Intellectual Property Administration, Office Action, including Search Report, received for Application No. 202011450848.6, dated May 26, 2023, 21 pages, People's Republic of China.

* cited by examiner

METHOD OF OPERATING A STEAM GENERATOR, STEAM GENERATOR AND COOKING DEVICE

CROSS-REFERENCE TO RELATED APPLICATIONS

This application claims priority to European Application No. 19216086.9, filed Dec. 13, 2019, the contents of which are hereby incorporated herein in its entirety by reference.

FIELD OF APPLICATION AND PRIOR ART

The invention is directed to a method of operating a steam generator, in particular in a cooking device or a household device operating with steam. Furthermore, the invention is directed to such a steam generator as well as to a cooking device with such a steam generator. Steam generators for cooking devices for cooking purposes or the like are known for example from EP 2 366 315 B1 or EP 2 397 755 B1. A problem with these steam generators is how to find a way to empty a water container of the steam generator after operating of a steam household device, in order to avoid problems with hygiene in the water container due to water staying too long in the water container.

Problem and Solution

The object of the invention is to provide a method of operating a steam generator as well as such a steam generator and a cooking device with such a steam generator with which problems of the prior art can be avoided and, in particular, it is possible to optimize operating a steam generator.

This object is achieved with a method having the features of claim 1, a steam generator having the features of claim 11 and a cooking device having the features of claim 19. Advantageous and preferred design embodiments of the invention are the subject matter of the further claims and will be explained in more detail hereunder. Some of the features are only described for the method, only described for the steam generator or only described for the cooking device. Independently of this, they can be applied to such a method, such a steam generator or such a cooking device independently and on their own. The wording of the claims by way of explicit reference is incorporated in the content of the description.

In the method according to the invention, the steam generator comprises a water container with a circumferential wall, preferably in the form of a vertically oriented cylinder, for example with round-cylindrical cross-section. Two separate heating devices are provided or located on the wall of the water container, in particular on a lateral outside of the wall of the water container. The two heating devices are located in different height regions separated from each other in vertical direction. One heating device is an upper heating device and the other heating device is a lower heating device such that the upper heating device is above the lower heating device. A first temperature detection device is provided covering a temperature detection area in which a temperature is measured, in particular the reaching of a predefined first temperature threshold is measured. The temperature detection area includes at least the area covered by the two heating devices, wherein preferably also an area of the water container or its lateral wall, respectively, between the two heating devices is covered. A control device for monitoring and evaluating the first temperature detection device is provided, which also controls the activation state of the two heating devices, which can mean that the control device activates or deactivates the two heating devices. The method provides the steps of filling the water container with water and operating the steam generator afterwards by heating with at least one of the two heating devices that are being activated, preferably by the control device. Steam is then generated for operation of a steam cooking device with this steam, preferably for cooking purposes. After the operation of the cooking device is finished, for example because a respective steaming program is finished, steam generating is finished because no more steam is required. After that, at least one heating device is activated, wherein preferably at least the lower heating device is activated or both heating devices are activated, until the first temperature detection device detects that the predefined first temperature threshold named above has been reached. Also the upper heating device can be activated for the first time. This predefined first temperature threshold may be chosen such that it guarantees operating the steam generator in a safe and secure mode, wherein if this first temperature threshold would be exceeded for more than 20° C. or 40° C., a serious damage to the steam generator could occur.

As soon as the first temperature detection device detects the reaching of the predefined first temperature threshold, one heating device is deactivated, preferably the upper heating device if it is active or the lower heating device if the upper heating device is not active. If more heating devices than only the lower one had been activated, only they are being deactivated. Then remaining water in the water container is pumped off for a predefined first pumping duration or the lower heating device is activated again until the first temperature detection device detects that a pre-defined first temperature threshold has been reached again. This pumping off may occur with a constant pump rate, in particular by means of an outlet pump provided in the steam generator or in the cooking device, respectively. It is possible that this outlet pump is provided only for the purpose of pumping off remaining water from the water container. Activation of the lower heating device also serves to remove water from the water container.

The aim of the invention is to reduce not only a pumping duration for emptying the water container, but mainly to remove or evaporate water from the water container until a certain defined level of water is reached before pumping off is started.

When both heating devices are activated and heat the water remaining in the water container after finishing steam generating, they remove the water by evaporation until the upper heating device does not have sufficient thermal contact with water in the water container to dissipate its heat, which results in the first temperature detecting device to detect the first temperature threshold. Then the water level is most probably in the lower region of the upper heating device or between the two heating devices. In any case, this water level can be determined from the construction of the steam generator and a few experiments.

When only the lower heating device is activated and heats the water remaining in the water container after finishing steam generating, this water is preferably evaporated until the water level is too low to absorb a large or substantial part of the heat generated by the activated lower heating device. This may mean for example that the water level is at less than half the height of the lower heating device in vertical direction, or preferably at less than 20% of this height. In any case, it can be measured from experiments with such a steam generator at which water level the activated lower heating device effects to reach the predefined first temperature threshold.

If the water level is known, the quantity of water remaining in the water container can easily be determined and, if the pump rate of the outlet pump is known, the predefined first pumping duration can be determined rather exactly. This allows for the outlet pump not to have to pump substantially more time than needed, because this should be avoided in order to avoid unnecessary noise at the end of operation of the cooking device e.g. by the outlet pump running dry. Usually it is preferred to be on the safe side when pumping off remaining water so that really no water is left in the water container. However, the outlet pump should not work too long if not necessary, especially not when running dry.

If the pump rate of the outlet pump is not known, one of the heating devices, preferably only the lower heating device, is activated again to evaporate water after the predefined first pumping duration, wherein this activation takes place until the predefined first temperature threshold is reached again, which is being detected by the first temperature detection device. This means that at least now there probably is not much water left in the water container.

In an embodiment of the invention, the lower heating device is activated again after pumping off or after the predefined first pumping duration has elapsed. Preferably, only the lower heating device is activated and not the upper heating device. It can be provided that the lower heating device is activated until the first temperature detection device detects that the first temperature threshold has been reached again. Then the lower heating device is deactivated again. Such a renewed activation of the lower heating device serves for evaporating the last remains of water in the water container, preferably to really dry the inside of the water container by heat. Then no pumping action may occur anymore.

In a further embodiment of the invention, the sequence described before with activating only the lower heating device for drying the inside of the water container is carried out at least two times, preferably five to ten times. This provides for complete evaporation and thus removal of remaining water in the water container by heating. A duration of such an activation of the lower heating device may be between 1 sec and 10 sec, preferably between 2 sec and 5 sec. Alternatively, a duration may be until the first temperature detection device detects that the first temperature threshold has been reached again.

It may be the case that the pump rate of the outlet pump for pumping off water from the water container is not known as described before. Then it is advisable to be able to adapt the pumping duration. For this purpose, it can be provided that a pumping duration of pumping off the remaining water from the water container for future pumping off is determined in the control device from the predefined first pumping duration used at the beginning of pumping off. This predefined first pumping duration is being decreased or lowered by the control device in case, during the step of heating again with the lower heating device after pumping off remaining water, the first temperature threshold is reached after less than 4 sec, preferably less than 3 sec. This means that no or almost no water has been left in the water container. Alternatively, the sequence is being carried out once more and the duration until the first temperature threshold is reached for the second time is 5% to 20% shorter than the duration until the first temperature threshold is reached for the first time. In a preferred embodiment of the invention, the predefined first pumping duration is decreased or lowered by 10%, alternatively decreased by 20%.

On the other hand, the pumping duration of pumping off the remaining water from the water container for a future pumping off can be increased from the predefined first pumping duration by the control device when, in the step of heating again with the lower heating device after pumping off remaining water, the first temperature threshold is reached only after more than 3 sec, in particular after more than 5 sec or 6 sec. This means that a substantial amount of water is left in the water container after pumping off for the predefined first pumping duration, which means that this pumping duration should be increased. Alternatively, the predefined first pumping duration may be increased if the duration until the first temperature threshold is reached for the second time is more than 20% longer than the duration until the first temperature threshold is reached for the first time. In particular, it may be that the second time is more than 50% longer. It is advisable to increase the pumping duration from the predefined first pumping duration by 10% or even 20%. Such an increased pumping duration can make sure that the remaining water in the water container after operating the cooking device is really removed.

In a preferred embodiment of the invention, such an adaptation or decreasing or increasing of the pumping duration is being made each time that remaining water from the water container is pumped off. This can allow for the control device to find a pumping duration after for example five to fifteen or twenty sequences of operating the cooking device or the steam generator, respectively, to find such an optimum pumping duration. In case such an optimum pumping duration has been found by the control device, the step of carrying out a sequence of activating the lower heating device for a rather short time to evaporate remaining water from the water container can be done away with or, alternatively, be at least reduced to being carried out only for two times.

In a further embodiment of the invention, after the initial evaporation of the water from the water container and before pumping off, a first pause period should be made before the water is pumped off out of the water container. Such a first pause period may be between 20 sec and 5 min, preferably less than 1 min. This helps for the water in the water container to cool down somewhat in order to protect the outlet pump from excess temperature.

Alternatively, directly after the initial evaporation of the water from the water container the water is being pumped off out of the water container. This helps to be quicker in removing the water. Furthermore, it may be used for sterilizing the inside of the pump, for example an outlet pump. It may also serve to easily evaporate the water in a faster way if after the pumping off the lower heating device must be activated again, because the residual heat in the water container is still higher.

In addition to the first temperature detection device which covers a temperature detection area and also detects a temperature threshold only at any location in this temperature detection area, without exactly localizing it, a temperature sensor being designed for point-like detection of a temperature may be provided. Preferably, this temperature sensor is arranged on a lateral outside wall of the water container. In particular, this point-like temperature sensor can be arranged in a region between the upper heating device and the lower heating device. It may be provided that no heating device is in the region of this temperature sensor or at a distance of less than 5 mm from this temperature sensor. So a certain minimum distance between the heating devices and this temperature sensor is given. This serves for the temperature sensor being rather independent in measuring and not influenced by the heating devices. This temperature sensor may serve for detecting whether boiling water is at a height level inside the water container at a height corresponding to the location of the temperature sensor.

In a further embodiment of the invention, the lower heating device can be placed or arranged less than 20 mm from a baseplate of the water container. Preferably it is placed less than 8 mm in vertical direction over the baseplate. This provides for generating heat and heating water in the water container already at a very low level of water, which means that when water is being filled into the water container, a steam generating process can be started rather quickly. Furthermore, this serves for evaporating and removing remaining water from the water container by being able to provide the heat necessary for that at a lower height level.

These and further features will emerge not only from the claims but also from the description and from the drawings, wherein the individual features may be realized in each case individually or severally in the form of sub-combinations in an embodiment of the invention and in other fields, and may constitute advantageous and independently protectable embodiments for which protection is claimed here. The division of the application into individual sub-sections and sub-headings does not restrict the statements made here in terms of their general applicability.

BRIEF DESCRIPTION OF THE DRAWINGS

In the following, embodiments of the invention will be described in detail with reference to the drawings. Throughout the drawings, the same elements will be denoted by the same reference numerals.

DETAILED DESCRIPTION OF THE EMBODIMENTS

Figure 1:
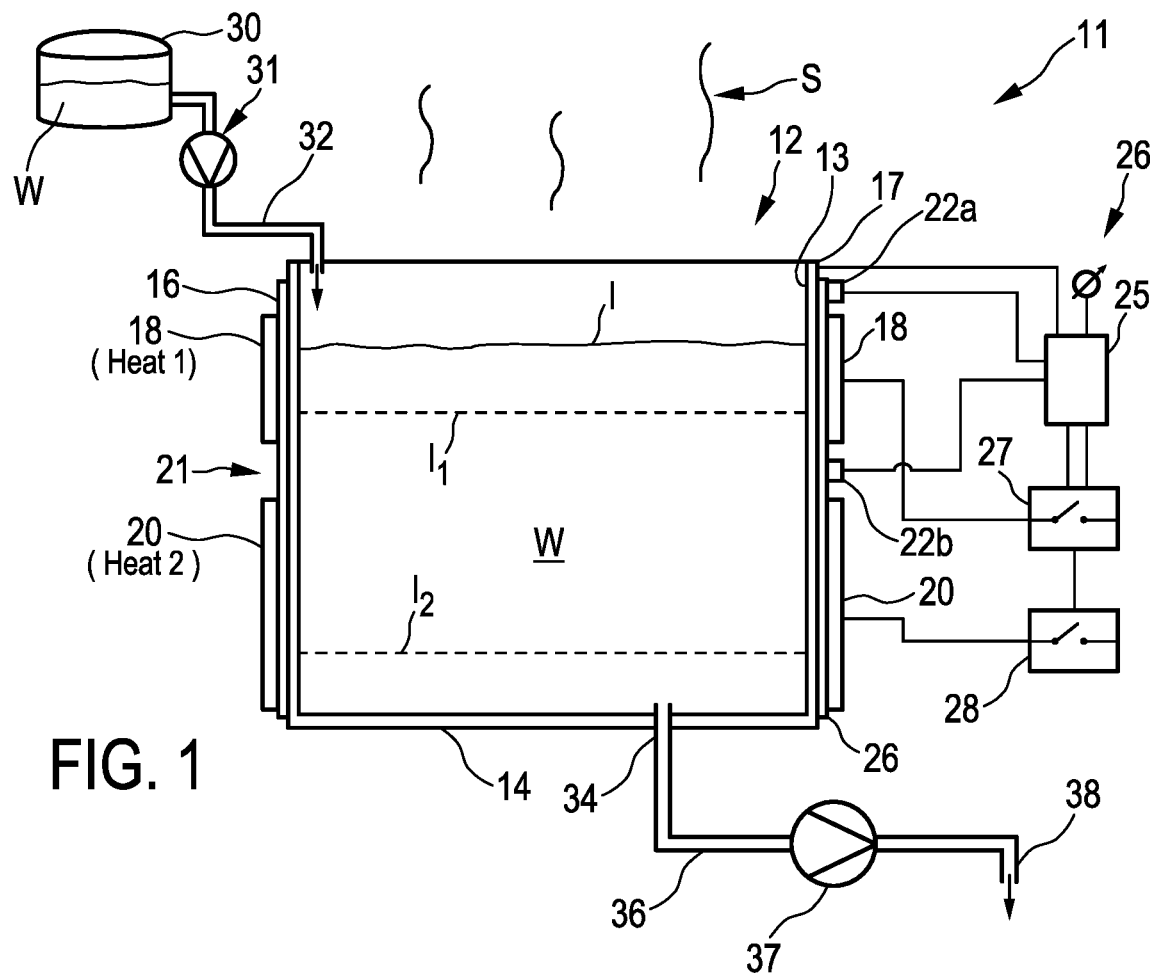
FIG. 1 a schematic overview of a steam generator according to the invention, FIG. 2 a steam cooking device according to the invention with a cooking chamber and a steam generator according to FIG. 1, FIG. 3 a flow diagram according to a first embodiment of a method of operating a steam generator according to the invention, wherein both heating elements are operated in the beginning, FIGS. 4 and 5 a simplified view on the steam generator according to FIG. 1 with two different water levels which are reached with both heating elements or with only one heating element activated, FIG. 6 a modification of the flow diagram of FIG. 3, wherein either both heating elements are activated or both heating elements are deactivated before pumping is started, FIGS. 7 and 8 two water levels $l_1$ and $l_3$ similar to FIGS. 4 and 5, which can be reached with a modified embodiment of the invention, and FIG. 9 a further modification of the flow diagram of FIG. 3, wherein only the lower heating element is used for evaporating water.

In FIG. 1 a steam generator 11 according to the invention is shown, the steam generator 11 having a water container 12 which advantageously is in the form of a vertical or upright round-cylindrical container. Water container 12 has a circumferential lateral wall 13 and a base plate 14, which are connected in watertight manner. Lateral wall 13 is made of metal, preferably of stainless steel. Base plate 14 can also be made of the same material, alternatively from synthetic material being connected in watertight manner to the lateral wall 13. On top of water container 12 a kind of cover or lid for collecting or concentrating steam S might be provided, for example as known from EP 3278691 A1. This is, however, not important for the invention. In any case, the steam S can rise from the water container 12 and be guided in a steam channel or the like to the location of its application. This is described later in FIG. 2.

The outside of lateral wall 13 is preferably mostly covered by a dielectric isolation 16 in the form of a thin layer. Dielectric isolation 16 preferably contains glass or glass ceramic and can be fabricated preferably according to DE 10 2013 200 277 A1 or WO 2007/136268 A1. It is only important that the material of this dielectric isolation 16 is adapted so as to change its resistance behavior strongly at the temperature threshold mentioned before, which is preferably a temperature between 150° C. and 300° C.

An upper heating element 18 is applied onto the dielectric isolation 16 as shown here, which is also denominated by heat 1. The upper heating element 18 may be applied in meandering form or in the form of several parallel stripes or in the form of a closed area layout being circumferential around the water container 12, which is but known from the prior art as mentioned before, for example according to US 2017/0086257 A1. It is preferably a thick film heating element.

A lower heating element 20 is applied on the outside of lateral wall 13 directly onto the dielectric isolation 16. The lower heating element 20 is also denominated by heat 2, and is basically in a shape or form similar to the upper heating element 18, preferably also according to US 2017/0086257 A1. It is important that the upper heating element 18 is located above the lower heating element 20 in vertical direction, which direction in this case is extended from base plate 14 at right angle upwards, which is also the direction that the steam S is taking which rises from water W in the water container 12. There is a distancing ring region 21 between the two heating elements 18 and 20 which is ring-like or runs circumferentially around water container 12. The width of the ring region 21 may be between 5 mm and 20 mm. The heating elements 18 and 20 correspond to the heating devices described before.

The upper heating element 18 is activated by a switch 27 with which it is connected, wherein switch 27 preferably is connected to an energy source, for example a mains connection of the steam generator 11. This is not shown here, but can easily be conceived by a person skilled in the art. In similar manner, the lower heating element 20 is connected to a switch 28 which is also connected to the same energy source. The switches 27 and 28 are controlled by a control 25 which is the control for the whole steam generator 11, preferably also for a corresponding steam cooking device according to FIG. 2. Control 25 is also connected with a connection 17 to the lateral wall 13 of the water container 12 to measure a leakage current as explained before from one of the heating elements 18 and 20 through the dielectric isolation 16. By connection of the control 25 to switches 27 and 28, a measuring apparatus 26 connected to the control 25 can measure the leakage current through the dielectric isolation 16. For details of such a measuring of leakage current it is pointed to WO 2007/136268 A1 and DE 10 2013 200 277 A1 named before, which is easy for the person skilled in the art to conceive and to put into practice.

An upper temperature sensor 22a is provided on the outside of lateral wall 13, in this case also on the dielectric isolation 16 and slightly above the upper heating element 18 in the vertical direction. A lower temperature sensor 22b is placed between the upper heating element 18 and the lower heating element 20 in the ring region 21, preferably also placed onto the dielectric isolation 16. This is mainly for the reason so that there is sufficient electrical isolation to the metallic lateral wall 13 of the water container 12. The temperature sensors 22a and 22b can be made for point-like temperature detection, for example as NTC temperature sensors in SMD construction manner. They should be attached with a good thermal contact to the lateral wall 13 so as to detect its temperature or the temperature of water W inside the water container 12 and potentially being right on the other side of the lateral wall 13. Temperature sensors 22a and 22b are also connected to the control 25 for evaluation.

For filling water W into the water container 12, a fresh water tank 30 is provided which can also be a connection to a fresh water pipe. By operating a valve 31, alternatively a pump, water W from the fresh water tank 30 can be filled into the water container 12, for example until a water level l is reached as is shown here, which is about as high as a middle region of the upper heating element 18. Two water levels are shown in dashed lines, wherein an upper water level l1 is the water level at which, when it is reached and fallen below, the upper heating element 18 in its activation state generates so much heat that the temperature detection device, which is mainly made up of the dielectric isolation 16 together with the control 25 and the measuring apparatus 26, detects a sudden rise in a leakage current from the upper heating element 18 to the lateral wall 13. This is a clear sign of a temperature being too high somewhere in this region, or reaching a first temperature threshold, respectively, so that at least the upper heating element 18 is deactivated as explained before. If the water level l has been above water level l1 before and the water has been steamed off, the water level l1 is usually constantly as is shown here, which means that it is a known value which allows for a rather exact calculation of the quantity of water being inside the water container 12.

In similar manner the lower water level l2 is the water level which, when it is fallen below from a higher water level, effects a temperature rise in the region of the lower heating element 20. This temperature rise corresponding to passing the first temperature threshold can again be detected by the temperature detection device or at the dielectric isolation 16, respectively, so that the lower heating element 20 is deactivated before a critical temperature is reached. In the same manner as water level l1, water level l2 is usually rather constantly reached at this point and also allows for a rather exact calculation of the quantity of water W being inside the water container 12 when the temperature at the dielectric isolation 16 reaches this first temperature threshold.

From base plate 14 a water outlet 34 leads via an outlet pipe 36 to an outlet pump 37 which may correspond to the outlet pump described before. Alternatively, a valve could be provided in the outlet pipe 36 instead of the outlet pump 37, or in addition to it. The outlet pump 37 leads to an outlet 38 which may be a waste water outlet into a sewage. The outlet pump 37 is also connected to control 25 and is preferably controlled by control 25.

Figure 2:
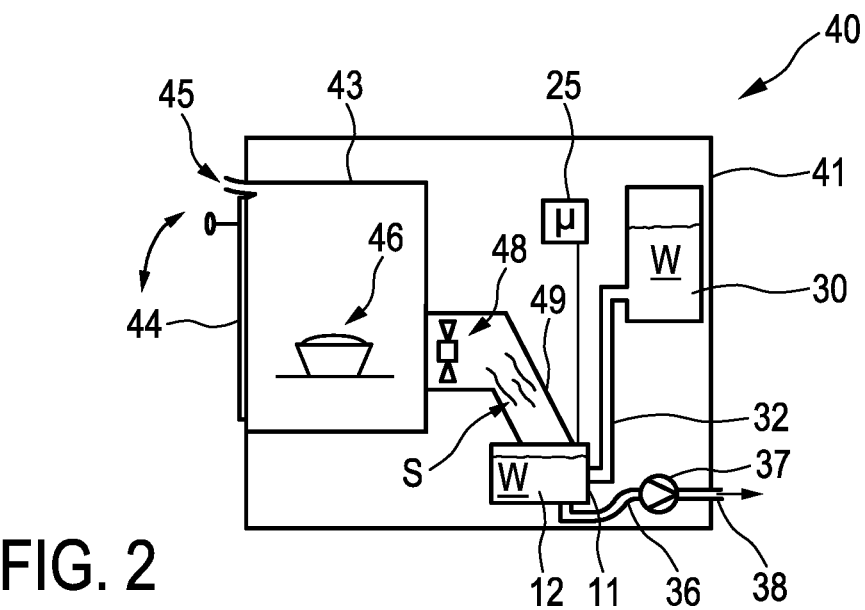

In FIG. 2 a steam cooking device 40 is shown schematically which has a housing 41 and a cooking chamber 43 inside the housing 41. The cooking chamber 43 can be closed with a chamber door 44 above which a steam outlet 45 is provided. Inside the cooking chamber 43 food 46 can be placed for being cooking with the help of hot steam.

A ventilator 48 is provided for transporting steam from the steam generator 11 with water W in the water container, wherein the steam S is blown into the cooking chamber 43 in known manner through a steam channel 49. Furthermore, control 25 is provided for the whole steam cooking device 40. A fresh water tank 30 is provided inside the steam cooking device 40 and is connected via a fresh water pipe 32 to the steam generator 11.

Also in FIG. 2 it is shown that an outlet pipe 36 out of the steam generator 11 leads to an outlet pump 37 which can pump water out of the steam cooking device 40 via the outlet 38.

Figure 3:
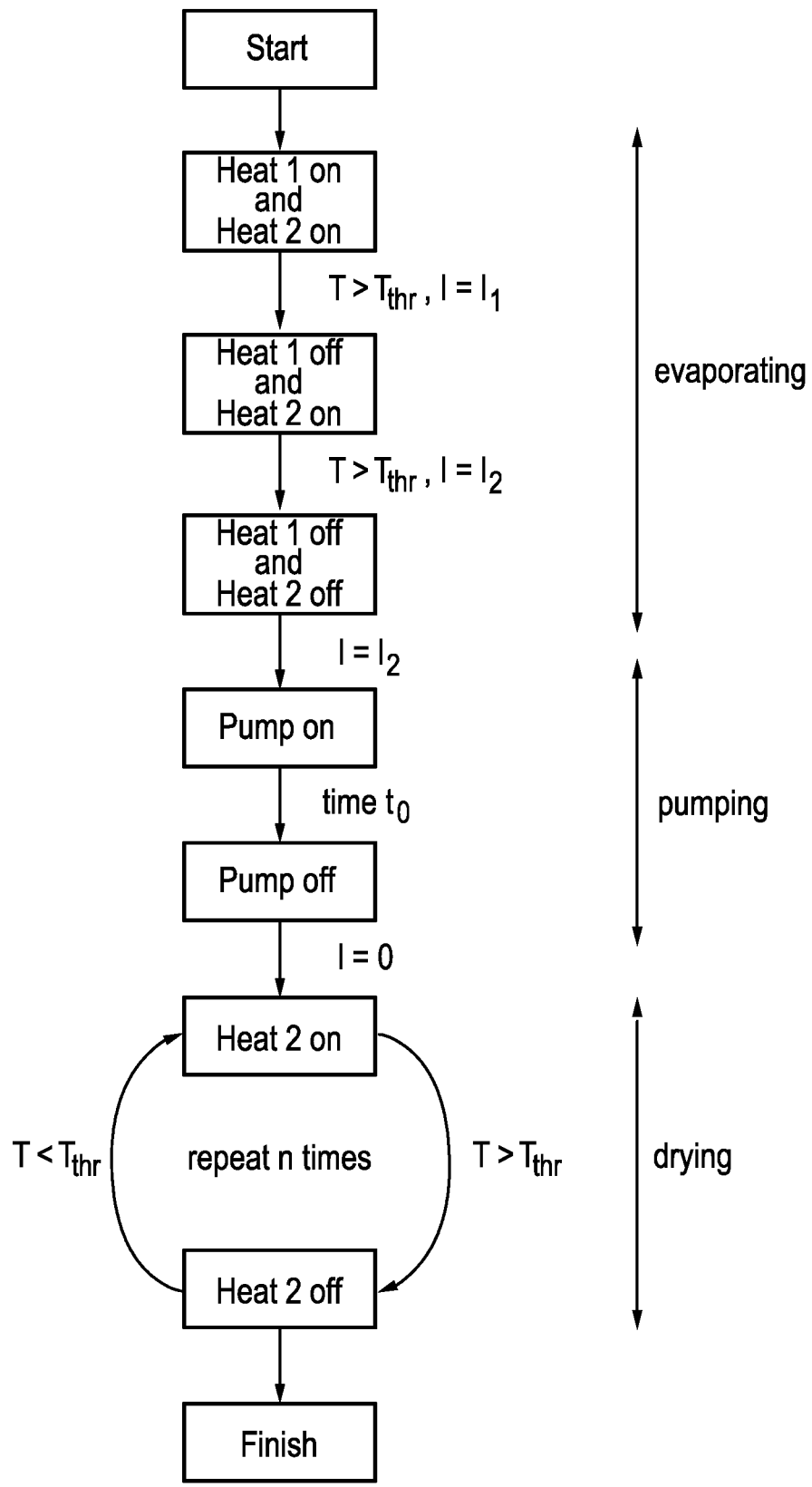
Figure 4:
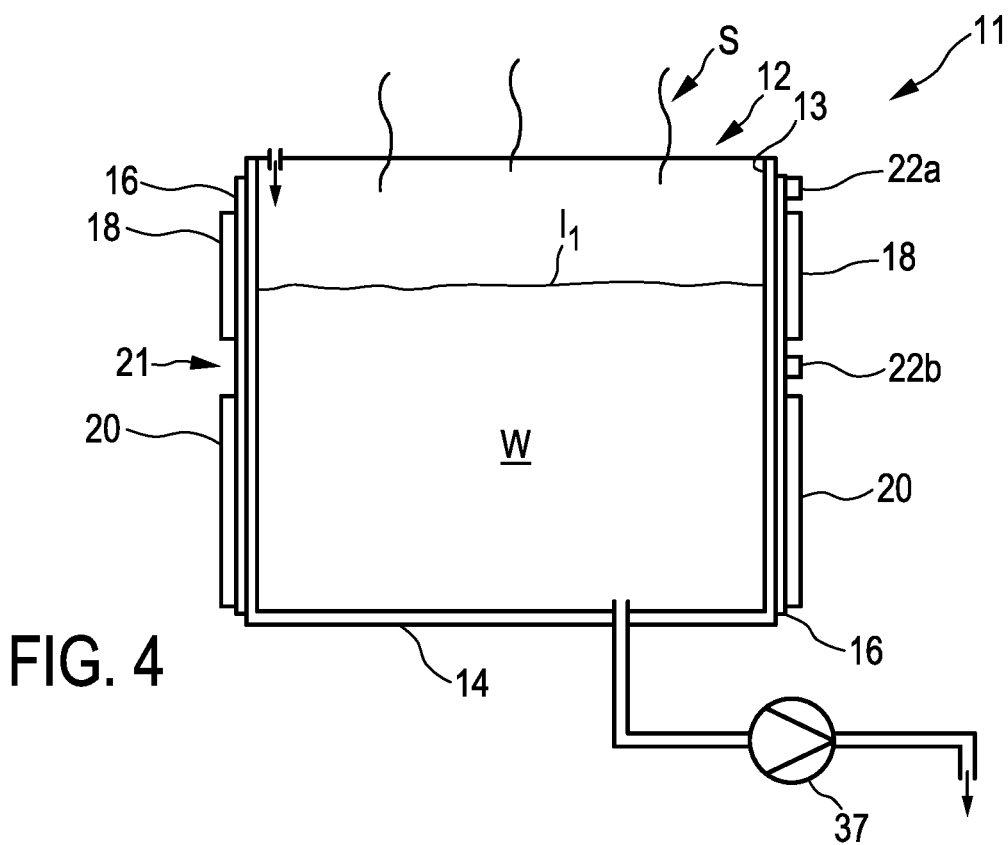

In FIG. 3 the flow diagram is shown which illustrates the method according to one embodiment of the invention which starts here after operation of the steam cooking device 40 for a certain duration. The start of the operation according to the flow diagram in the uppermost box means that now the water container will have to be emptied, but no more steam is required for operation of the steam cooking device 40. So the process of emptying the water container 12 is started. According to the second box, in this embodiment of the invention the lower heating device 20 and the upper heating device 18 are activated or, respectively, heat 2 and heat 1 are in the on-state. They heat an unknown quantity of water inside the water container, and this quantity of water is unknown because the water level l is not known after finishing the steam generating for the steam cooking device 40. Both heating devices 18 and 20 are active until a temperature measured by the first temperature detection device or at the dielectric isolation 16, respectively, reaches the pre-defined first temperature threshold Tthr. This first temperature threshold Tthr has been pre-defined in the control 25, it may be between 150° C. and 300° C. From the dimensions of the steam generator 11 as well as from experiments it is known that, after generating steam S for the operation of the steam cooking device 40, and both heating element are activated again for emptying the water container 12, a certain water level l1 has been reached when for the first time the temperature reaches the first temperature threshold Tthr. This first water level l1 is shown in FIG. 4 in the simplified steam generator 11. The first water level l1 is in this case at a height of about the lower third of the upper heating element 18. It is obvious that this water level l1 could, due to some influencing factors, also be somewhat higher or somewhat lower.

In this case, because there is much water W left in the water container 12 according to the water level l1, and the noise of the outlet pump 37 shall be reduced as far as possible, some more water should be removed by evaporating. As such, according to the third box from above in FIG. 3, only the lower heating element 20 is activated as heat 2. From FIG. 4 it can be taken that it would not make any sense to activate the upper heating element 18 again, because a temperature would very fast reach the first temperature threshold Tthr again. So a second heating sequence is started which is after the first heating sequence, and at least one of these sequences is a prerequisite according to the definition of the invention as above.

Figure 5:
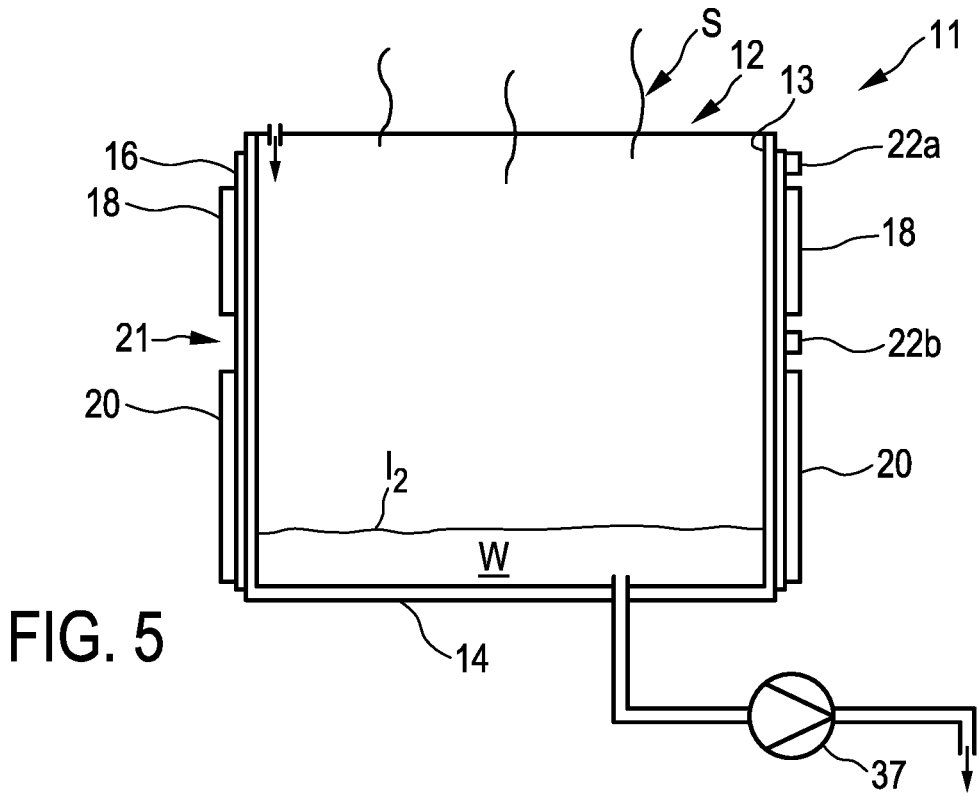

If now with only the lower heating element 20 activated a temperature reaches the first temperature threshold Tthr again, this means that the water level l2 according to FIG. 5 has been reached. Also the water level l2 is in the lower third of the height of the lower heating element 20. It is also possible for this water level l2 to vary somewhat, although it can be predicted rather exactly. So after also the lower heating element 20 has been deactivated, evaporating of water W from the water container 12 in the form of steam S is stopped and, at the water level 12, the outlet pump 37 is activated and starts the pumping sequence. As a pumping rate of the outlet pump 37 may not be known exactly or even roughly, a certain predefined first pumping duration tO can be used. After this predefined first pumping duration tO has elapsed, the outlet pump 37 is stopped and also the pumping sequence ends. This predefined first pumping duration tO can be calculated according to an average of typical pumping rates of outlet pumps used for this purpose.

After the pumping sequence has ended, it is not known whether there is some water W left in the water container 12 which should also be removed. It should be avoided to start the pump again or have it still active for the risk of loud pumping noise. For this reason a drying sequence is started where only the lower heating element 20 is activated and starts heating action. If some water should be still inside the water container 12, it is evaporated again. As the water level now is definitely lower than the water level 12, which has already effected that the temperature has quickly reached the first temperature threshold Tthr, and now definitely less water is inside the water container 12, it can be expected that the lower heating element 20 is only activated for a rather short time which may be some seconds, for example 3 sec to 6 sec. Then of course after reaching the first temperature threshold Tthr, the lower heating element 20 is deactivated again such that the temperature again falls below the first temperature threshold Tthr.

According to the flow diagram, the lower heating element 20 is then activated again for evaporating potentially remaining water in the water container 12. Then again the temperature may reach the first temperature threshold Tthr rather quickly, for example after 3 sec to 6 sec, which leads again to a deactivation of the lower heating element 20. If now the second duration of activation of the lower heating element 20 is the same as the first duration, the conclusion is that there is no more water left inside the water container 12 and the drying cycle needs not be repeated for a third time. In consequence, the control 25 regards the water container 12 as being completely empty or dry and the operation is finished.

It can be provided that the control 25 is able to learn, which means that if the last cycle of drying by repeatedly activating and deactivating the lower heating element 20 occurs for a number of five to ten times, this means that the outlet pump 37 has not removed the largest part of the water remaining in the water container 12. This leads to the control 25 increasing the first pumping duration somewhat, for example by 10% or 20%. The next time that the water container 12 has to be emptied from water after operating the steam cooking device 40, the control 25 can check whether at the end of the sequence of the flow diagram according to FIG. 3 one, two or three times repeating the last cycle of drying by activating the lower heating element 20 for a rather short time is sufficient. If this is the case, this slightly increased first pumping duration is now being used in the future. If the control 25 can see that the last cycle of drying by activating the lower heating element 20 still needs to be repeated for more than three times, the first pumping duration is increased again, preferably again by 10% or 20%. In the next case that the water has to be removed completely from the water container 12, the same is repeated again until a new first pumping duration has been found that needs only one, two or three cycles of activating the lower heating element 20 to completely dry the water container 12.

If, on the other hand, in the last sequence of drying the water container 12 by activating the lower heating element 20 for a rather short duration, the first temperature threshold Tthr is reached after less than 3 sec for example, this means that already now no more water seems to be left in the water container 12. Although this may basically seem to be welcome, it bears the risk that the outlet pump 37 has been pumping for too long. This means that the generation of noise of the outlet pump has been too long and could potentially be shortened. In this case the control 25 decreases or lowers the predefined first pumping duration somewhat, preferably by 10% or 20%. This new reduced first pumping duration is, similar to what has been described before, now being used for the next time the water has to be completely removed from the water container 12. If again in the last sequence of drying the water container 12 according to FIG. 3, activating the lower heating element 20 leads to reaching the first temperature threshold Tthr in less than 3 sec for the first time or also for the second time, but at least for the first time, that the pumping duration may still be too long. In consequence, the control 25 can decrease or lower the first pumping duration once more by 10% or 20%. The control 25 can then apply this new decreased pumping duration the next time.

Similar to what has been described before, this adaptation or decrease of the first pumping duration tO is made until it takes the lower heating element 20 in the drying sequence according to FIG. 3 for example three times about 3 sec until the first temperature threshold Tthr has been reached after activation of the lower heating element 20 to evaporate any water in the water container 12.

Figure 6:
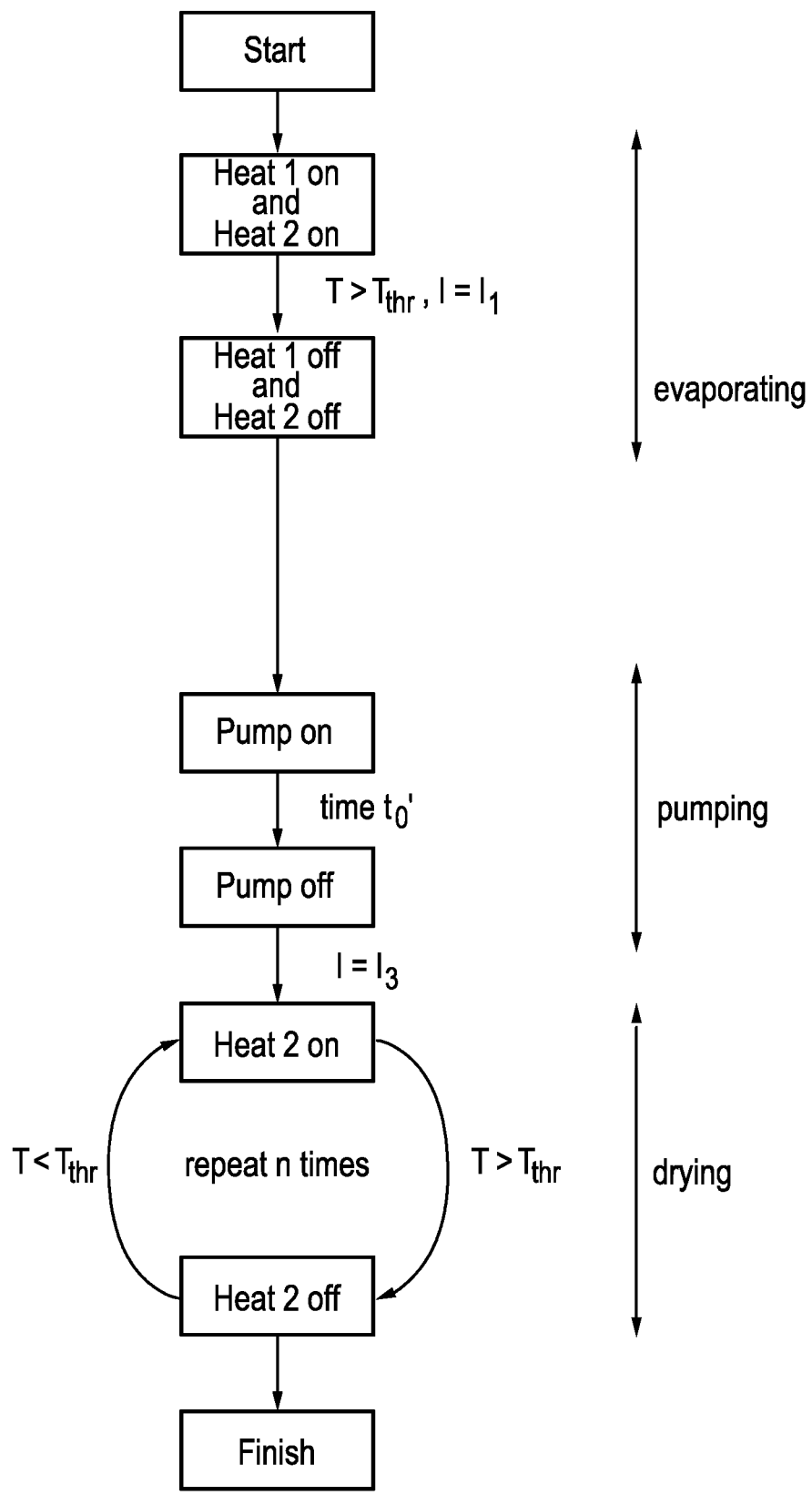
Figure 7:
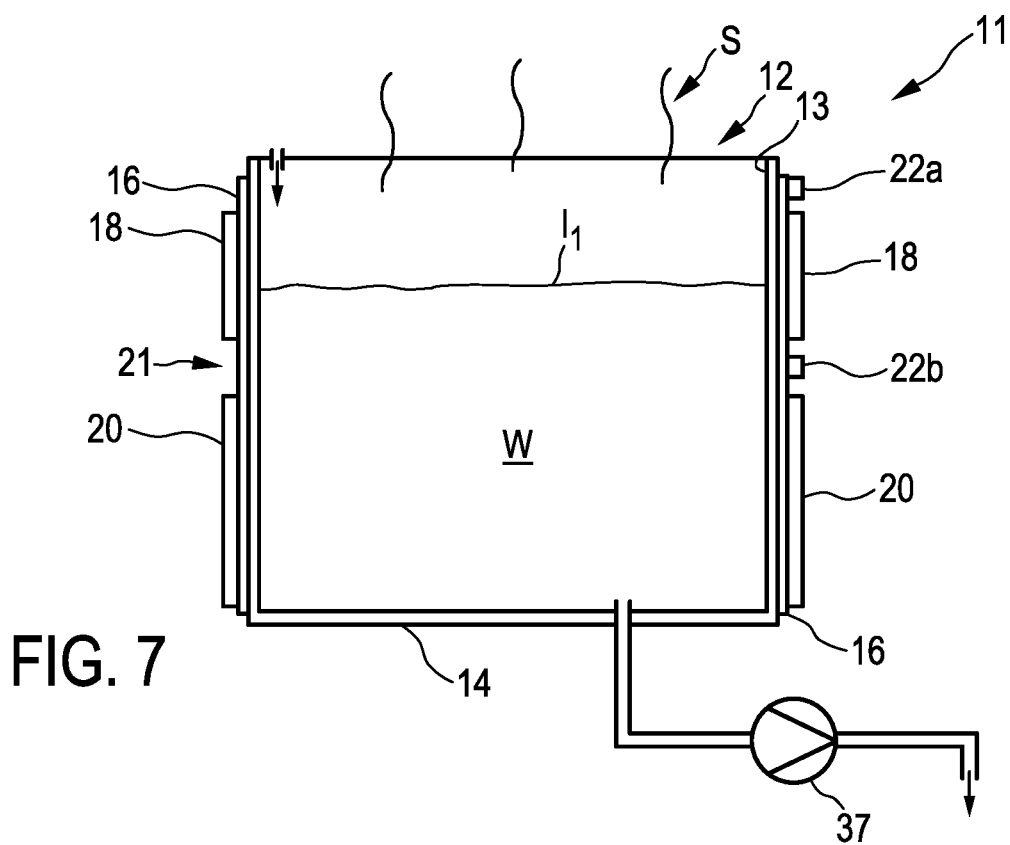
Figure 8:
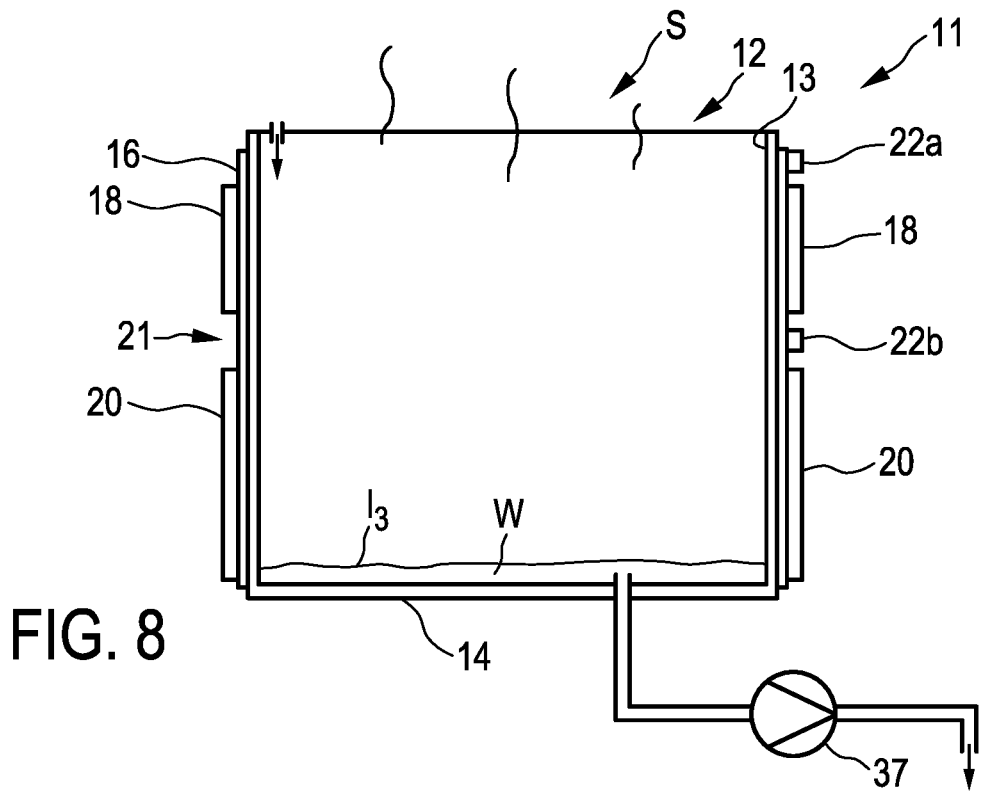

While the FIGS. 4 and 5 with the water levels 11 and 12 show the method described before according to FIG. 3, the FIGS. 7 and 8 show according to a flow diagram according to FIG. 6 that water is pumped from water level 11 down to a low water level 13. The first two steps of the flow diagram according to FIG. 6 correspond to the ones of FIG. 3 together with the temperature reaching or passing the predefined first temperature threshold Tthr. This means that the water W is about at a water level 11. In the case of FIG. 6, heating is stopped and no additional heating step with reduced heating power is performed. Both heating elements 18 and 20 are deactivated, heat is off in each case. In the next step, the outlet pump 37 is turned on and starts pumping out water W of the water container 12. This is done for a predefined first pumping duration tO', which is obviously much longer than the pumping duration tO described in relation to FIG. 3 because the quantity of water that needs to be pumped off is larger, see FIGS. 7 and 8. If the pumping rate is known as in the case at hand, the water is pumped off such that after the first pumping duration tO' the water level 13 according to FIG. 8. This water level 13 as a quantity difference toll is chosen such that even with some variation of water level 11, the outlet pump 37 does not run dry in any case.

In the next step, the lower heating element 20 is activated in a drying cycle which has been described before. Only this time the lower heating element 20 may need more than three cycles to remove or evaporate all the water left in the water container 12. If now the control 25 recognizes that each time after activating the lower heating element 20 the temperature reaches the predefined first temperature threshold Tthr after less than 3 sec, the water container 12 is defined to be completely dry and drying of the water container 12 is finished.

Figure 9:
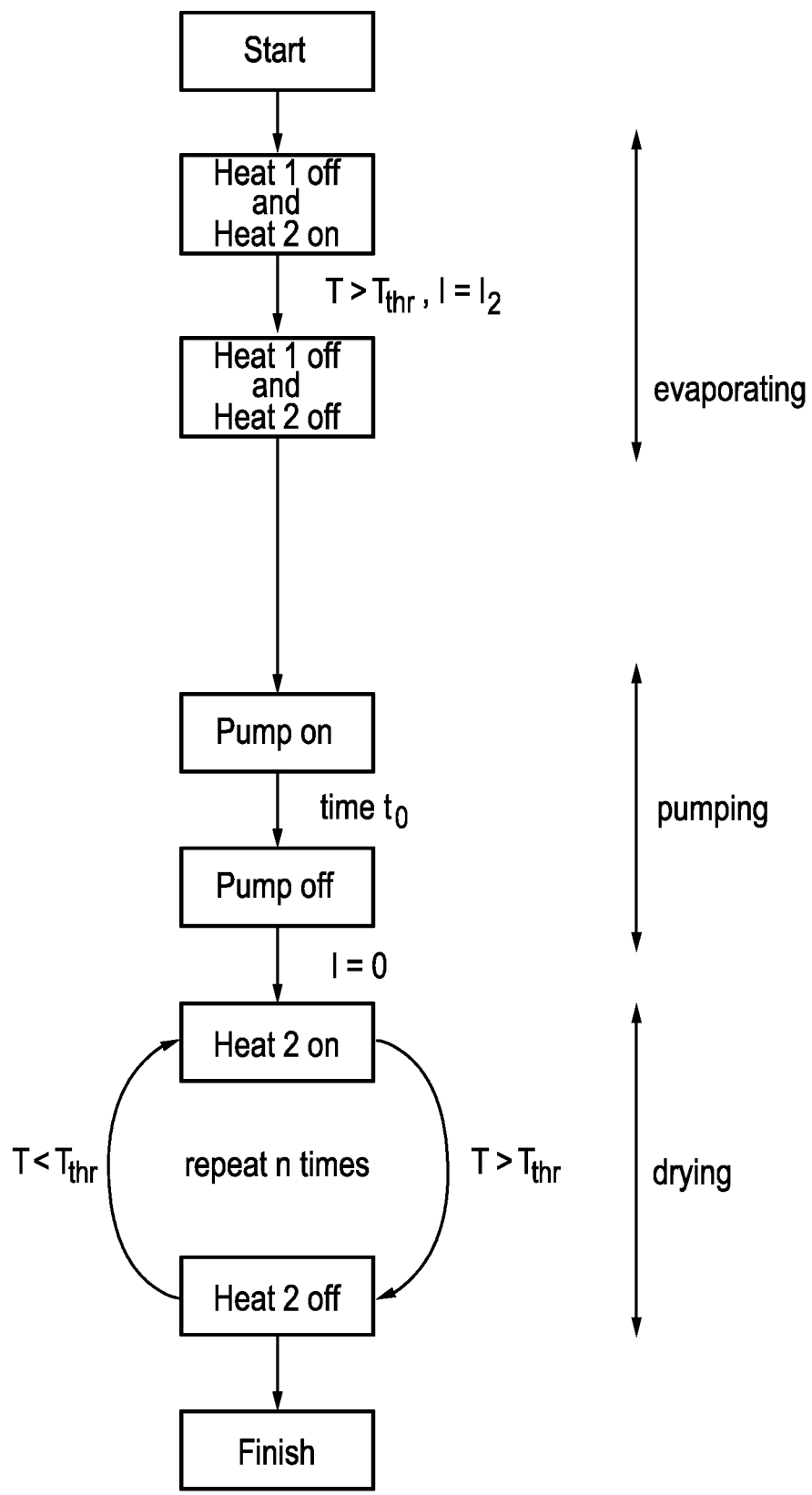

In the flow diagram according to FIG. 9, as a variation of the one according to FIG. 8, only the lower heating element 20 is activated according to the second step, whereas the upper heating element 18 is deactivated. The water level at the beginning is unknown. In consequence, the lower heating element 20 is heating the steam generator 11 alone and is evaporating any water being present until the temperature at the dielectric isolation 16 reaches the predefined first temperature threshold Tthr. According to what has been described with regard to FIGS. 3 to 5, this means that the water level l2 has most probably been reached. Then the step of evaporating is stopped and the further steps starting with pumping by turning on the outlet pump 37 correspond to what has been described with regard to FIGS. 3 to 5. So this need not be repeated again.

In an embodiment of the invention it may be provided that the absolute power of the lower heating element 20 could be higher or lower than the absolute power of the upper heating element 18. Preferably, both heating elements 18 and 20 have the same power, for example 750 W as a maximum continuous power.

A typical pumping rate could be in the range of 50 to 200 ml/min. A typical quantity of water in the water container 12 could be 50 ml at water level l2 and 120 ml at water level l1. Preferably, the first temperature detection device with the dielectric isolation 16 has a predefined first temperature threshold of about 300° C.

The invention claimed is:

1. A method of operating a steam generator, the method comprising the steps of:
providing a steam generator that comprises:
a water container with a circumferential wall,
two separate heating devices on said wall of said water container, said two separate heating devices being provided in different height regions separated from each other in vertical direction, one said heating device being an upper heating device and said other heating device being a lower heating device,
a first temperature detection device covering a temperature detection area, said temperature detection area including at least an area covered by said two heating devices, and
a control device for monitoring and evaluating said first temperature detection device and for controlling an activation state of said two heating devices,
filling said water container with water,
operating said steam generator by heating with at least one of said two heating devices being activated,
generating steam for operation of a steam household device and finishing steam generating after operation of said steam household device,
activating at least said lower heating device until said first temperature detection device detects that a pre-defined first temperature threshold has been reached,
deactivating one heating device of said heating devices,
pumping off remaining water in said water container for a pre-defined first pumping duration, and
after the pumping off step, activating said lower heating device one or more times until said first temperature detection device detects that the pre-defined first temperature threshold has been reached again.

2. The method according to claim 1, wherein said lower heating device is activated again after pumping off or after said pre-defined first pumping duration has elapsed.

3. The method according to claim 1, wherein only said lower heating device is activated and not said upper heating device, said lower heating device being activated until said first temperature detection device detects that said first temperature threshold has been reached and then said lower heating device is deactivated.

4. The method according to claim 1, wherein a pumping duration of said pumping off said remaining water from said water container for future pumping off is determined in said control device from said pre-defined first pumping duration used at a beginning of said pumping off, said pre-defined first pumping duration being decreased by said control device when, in said step of heating again with said lower heating device after pumping off said remaining water, said first temperature threshold is reached after less than 3 sec.

5. The method according to claim 4, wherein when said pumping off is performed for a next time, said pre-defined first pumping duration is adapted again.

6. The method according to claim 1, wherein a pumping duration of said pumping off said remaining water from said water container for future pumping off is determined in said control device from said pre-defined first pumping duration used at a beginning of pumping off, said pre-defined first pumping duration being increased by said control device when, in said step of heating again with said lower heating device after pumping off said remaining water, said first temperature threshold is reached only after more than 3 sec.

7. The method according to claim 1, further comprising, after an initial evaporation of said water from said water container until said first temperature threshold is reached, a step of waiting for a first pause period before said water is pumped off out of said water container with an outlet pump, for said water in said water container to cool down in order to protect said outlet pump from excess temperature.

8. The method according to claim 7, wherein said first pause period is 20 seconds to 5 minutes.

9. The method according to claim 1, wherein, directly after an initial evaporation of said water from said water container until said pre-defined first temperature threshold is reached, said water is pumped off out of said water container.

10. A steam generator comprising:
a water container with a circumferential wall,
two separate heating devices on said wall of said water container, said two separate heating devices being provided in different height regions separated from each other in vertical direction, one said heating device being an upper heating device and said other heating device being a lower heating device,
a first temperature detection device covering a temperature detection area, said temperature detection area including at least an area covered by said two heating devices,
an outlet pump, and
a control device for monitoring and evaluating said first temperature detection device and for controlling an activation state of said two heating devices,
wherein the control device is configured to perform the steps of claim 1.

11. The steam generator according to claim 10, wherein said two separate heating devices on said wall of said water container are located on a lateral outside thereof.

12. The steam generator according to claim 10, wherein said temperature detection area includes at least said area covered by said two heating devices and also an area of said water container between said two heating devices.

13. The steam generator according to claim 10, wherein a temperature sensor is arranged on a lateral outside of said water container.

14. The steam generator according to claim 13, wherein said temperature sensor is designed for point-like detection of a temperature.

15. The steam generator according to claim 13, wherein said temperature sensor is arranged in a region between said upper heating device and said lower heating device.

16. The steam generator according to claim 13, wherein no heating device is provided at a distance of less than 5 mm from said temperature sensor.

17. The steam generator according to claim 10, wherein said lower heating device is placed less than 20 mm from a baseplate of said water container in vertical direction over said baseplate.

18. A cooking device having a cooking chamber and the steam generator according to claim 10, wherein said steam generator is connected to said cooking chamber.

\* \* \* \* \*